(12) United States Patent
Littlejohn et al.

(10) Patent No.: US 9,419,489 B2
(45) Date of Patent: Aug. 16, 2016

(54) SLOT LINER FOR AN ELECTRIC MACHINE

(71) Applicant: General Electric Company, Schenectady, NY (US)

(72) Inventors: Matthew Hal Littlejohn, Green Island, NY (US); Xiaomei Fang, Niskayuna, NY (US); Wei Zhang, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 309 days.

(21) Appl. No.: 13/955,889

(22) Filed: Jul. 31, 2013

(65) Prior Publication Data

US 2015/0035405 A1 Feb. 5, 2015

(51) Int. Cl.
| | |
|---|---|
| H02K 3/34 | (2006.01) |
| H02K 3/32 | (2006.01) |
| H02K 3/48 | (2006.01) |
| H02K 3/30 | (2006.01) |
| H02K 9/22 | (2006.01) |

(52) U.S. Cl.
CPC .................. *H02K 3/345* (2013.01); *H02K 3/30* (2013.01); *H02K 3/325* (2013.01); *H02K 3/34* (2013.01); *H02K 3/32* (2013.01); *H02K 3/48* (2013.01); *H02K 9/22* (2013.01)

(58) Field of Classification Search
CPC ........... H02K 3/34; H02K 3/345; H02K 3/32; H02K 3/48; H02K 3/38; H02K 3/325; H02K 9/22
USPC ................................................ 310/214–215
See application file for complete search history.

(56) References Cited

U.S. PATENT DOCUMENTS

| | | | |
|---|---|---|---|
| 4,400,639 A | * | 8/1983 | Kobayashi et al. ........... 310/215 |
| 6,500,370 B1 | | 12/2002 | Belvin et al. |
| 6,733,943 B2 | | 5/2004 | Finn et al. |
| 6,969,940 B2 | | 11/2005 | Dalrymple et al. |
| 2004/0145267 A1 | | 7/2004 | Lowry et al. |

(Continued)

FOREIGN PATENT DOCUMENTS

| | | |
|---|---|---|
| JP | 55141947 A | 11/1980 |
| JP | 58150349 U | 10/1983 |

(Continued)

OTHER PUBLICATIONS

Iizuka, Shinichi; Kimura, Kouzou; Kusawake, Kazushi; Tatematsu, Kazutaka, Split Stator for Electric Motor, Nov. 20, 2008, Sumitomo Electric Industries, WO2008139912.*

(Continued)

*Primary Examiner* — Naishadh Desai
*Assistant Examiner* — Alexander Singh
(74) *Attorney, Agent, or Firm* — John P. Darling

(57) ABSTRACT

A slot liner for a stator and/or a rotor of an electric machine includes a body configured to be received within a stator slot and/or within a rotor slot. The body extends from a first end to an opposite second end and from a first edge to an opposite second edge. The body includes an inner segment and first and second outer segments that extend along the body. The first and second outer segments flank the inner segment such that the inner segment extends between the first and second outer segments along the body. The inner segment includes at least one different material such that a thermal conductivity of the inner segment is greater than a thermal conductivity of the first and second outer segments.

12 Claims, 5 Drawing Sheets

(56) References Cited

U.S. PATENT DOCUMENTS

| | | | |
|---|---|---|---|
| 2004/0263021 A1* | 12/2004 | Irwin et al. | 310/215 |
| 2011/0165410 A1 | 7/2011 | Aoyagi et al. | |
| 2012/0169172 A1* | 7/2012 | Anderton et al. | 310/214 |
| 2012/0219838 A1 | 8/2012 | Terada et al. | |
| 2013/0020900 A1* | 1/2013 | Takeuchi | 310/214 |
| 2013/0035468 A1 | 2/2013 | Yoshihara et al. | |
| 2014/0234617 A1 | 8/2014 | Masaki et al. | |

FOREIGN PATENT DOCUMENTS

| | | |
|---|---|---|
| JP | 11266557 A | 9/1999 |
| JP | 2005065373 A | 3/2005 |
| JP | 2010057211 A | 3/2010 |
| JP | 2011229283 A | 11/2011 |
| JP | 2013060576 A | 4/2013 |
| WO | 2008139912 A1 | 11/2008 |
| WO | WO 2008139912 A1 * | 11/2008 |
| WO | 2014076564 A2 | 5/2014 |
| WO | WO 2014076564 A2 * | 5/2014 |

OTHER PUBLICATIONS

Unofficial English Translation of Japanese Office Action issued in connection with corresponding JP Application No. 2014150315 on Jun. 2, 2015.
GB Search Report and Written Opinion issued in connection with corresponding GB Application No. GB1412026.5 dated Jan. 2, 2015.
Li et al., "Enhanced Thermal Conductivity of Polyimide Films via a Hybrid of Micro- and Nano-Sized Boron Nitride", The Journal of Physical Chemistry, vol. 114, Issue 20, pp. 6825-6829, Apr. 30, 2010.
Heinz et al., "Integration of Tough and Homogenous Layers Inproves Breakdown Stremght of Gfrp Laminated Rotor Slot Liners in Large Turbogenerators", IEEE Transactions on Electrical Insulation, vol. EI-12, Issue 2, pp. 171-175, Apr. 1977.
Pater et al., "Multifunctional Polyimides for Space Applications", 57th International Astronautics Congress, Oct., 2006, Location: Valencia, Spain.
"Fabrication of Polyimide-Matrix/Carbon and Boron-Fiber Tape", NASA Tech Briefs, Feb. 2007, Langley Research Center; pp. 17-18.
Office Action issued in connection with corresponding JP Application No. 2014150315 on Feb. 9, 2016.

* cited by examiner

SLOT LINER FOR AN ELECTRIC MACHINE

BACKGROUND

Rotating electric machines are used for a wide variety of applications, such as automotive applications, aerospace applications, industrial applications, and/or the like. Rotating electric machines include a rotor and a stator. A rotating electric machine may be an electrical motor, wherein the rotor rotates relative to the stator to convert electrical energy to mechanical energy. Rotating electric machines also include electrical generators, wherein the relative rotation between the rotor and the stator converts mechanical energy to electrical energy.

The stators of some rotating electric machines include a stator core having coils that are wound around stator teeth of the stator core. The coils are wound around the stator teeth within stator slots that separate the stator teeth. Slot liners may be provided within the stator slots to electrically isolate the coils from the stator core. In addition or alternatively, slot liners may be provided within rotor slots of the rotor of the electric machine to electrically isolate rotor coils from the rotor core. But, known slot liners are not without disadvantages. For example, some known slot liners consist of a neat polyimide (e.g., Kapton®) film, which has a relatively low thermal conductivity. Such a relatively low thermal conductivity may be a barrier to increasing the power density of some rotating electric machines, for example aircraft starter generators.

It is known to increase the thermal conductivity of neat polyimide films by adding a filler material. But, the amount of filler material necessary to increase the thermal conductivity of the neat polyimide film to a level that enables an increase in power density may increase the brittleness of the neat polyimide film. The increased brittleness of the neat polyimide film of the slot liner may cause the neat polyimide film to tear, fracture, and/or otherwise break as the windings of the coil are wound around the stator or rotor teeth, which may result in failure of the slot liner to electrically isolate the coil from the stator or rotor core.

BRIEF DESCRIPTION

In an embodiment, a slot liner is provided for a stator and/or a rotor of an electric machine. The slot liner includes a body configured to be received within a stator slot of the stator and/or within a rotor slot of the rotor. The body extends a length from a first end to an opposite second end. The body extends a width from a first edge to an opposite second edge. The body includes an inner segment extending along the length of the body. The body includes first and second outer segments extending along the length of the body. The first and second outer segments flank the inner segment along the length of the body such that the inner segment extends between the first and second outer segments along the length of the body and such that the first outer segment includes the first edge of the body and the second outer segment includes the second edge of the body. The inner segment includes at least one different material than the first and second outer segments such that a thermal conductivity of the inner segment is greater than a thermal conductivity of the first and second outer segments.

In an embodiment, a stator is provided for an electric machine. The stator includes a stator core extending a length along a central longitudinal axis. The stator core includes a stator base, stator teeth that extend radially from the stator base relative to the central longitudinal axis, and stator slots that extend between adjacent stator teeth. A coil is wound around a corresponding stator tooth. The coil extends within a corresponding stator slot. A slot liner is received within the corresponding stator slot. The slot liner includes a body extending a length from a first end to an opposite second end. The body includes an inner segment extending along the length of the body, and first and second outer segments extending along the length of the body. The first and second outer segments flank the inner segment along the length of the body such that the inner segment extends between the first and second outer segments along the length of the body. The inner segment includes at least one different material than the first and second outer segments such that a thermal conductivity of the inner segment is greater than a thermal conductivity of the first and second outer segments.

In an embodiment, a rotor for an electric machine includes a rotor core extending a length along a central longitudinal axis. The rotor core includes a rotor base, rotor teeth that extend radially from the rotor base relative to the central longitudinal axis, and rotor slots that extend between adjacent rotor teeth. The rotor includes a coil that is wound around a corresponding rotor tooth. The coil extends within a corresponding rotor slot. A slot liner is received within the corresponding rotor slot. The slot liner includes a body extending a length from a first end to an opposite second end. The body includes an inner segment extending along the length of the body, and first and second outer segments extending along the length of the body. The first and second outer segments flank the inner segment along the length of the body such that the inner segment extends between the first and second outer segments along the length of the body. The inner segment includes at least one different material than the first and second outer segments such that a thermal conductivity of the inner segment is greater than a thermal conductivity of the first and second outer segments.

DETAILED DESCRIPTION

Figure 1:
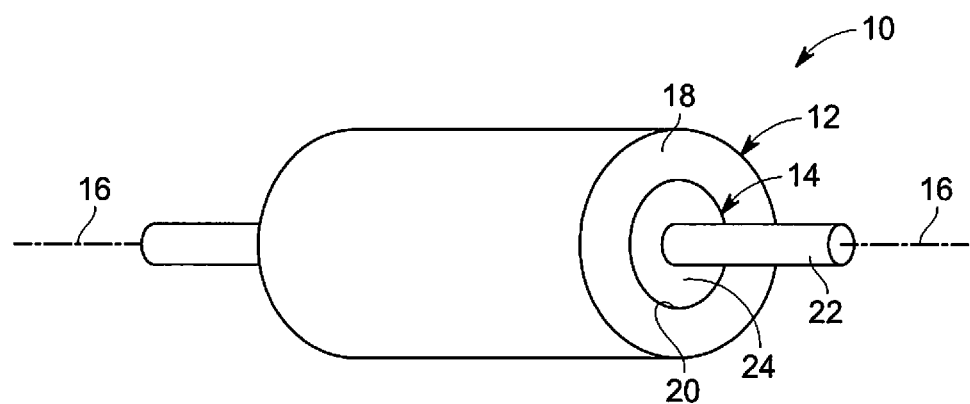
FIG. 1 is a perspective view of an embodiment of an electric machine.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property. As used herein, the term "conductor" is intended to mean a structure that conducts magnetic fields.

Various embodiments provide slot liners, stators, and electric machines. For example, various embodiments of slot liners, stators, and electric machines include slot liners having a body that includes an inner segment extending along the length of the body and first and second outer segments extending along the length of the body. The first and second outer segments flank the inner segment along the length of the body such that the inner segment extends between the first and second outer segments along the length of the body. The inner segment includes at least one different material than the first and second outer segments such that a thermal conductivity of the inner segment is greater than a thermal conductivity of the first and second outer segments. The outer segments may have a greater flexibility than the inner segments.

At least one technical effect of the various embodiments is increasing the power density of an electric machine, for example as compared to the power density of electric machines using known slot liners that are fabricated from neat polyimide (e.g., Kapton®) films. At least one technical effect of the various embodiments is providing a slot liner that has an increased thermal conductivity as compared to at least some known slot liners, but maintains the flexibility of such known slot liners at edges of the slot liner.

The various embodiments may be implemented within electric machines, which include electric motors and electric generators. Applications of electric machines include, but are not limited to, automotive applications, aerospace applications, industrial applications, and/or the like. The various embodiments of slot liners described and/or illustrated herein may be used with any type of rotating electric machine having any design, structure, configuration, arrangement, and/or the like.

FIG. 1 is a perspective view of an embodiment of an electric machine 10. The electric machine 10 includes a stator 12 and a rotor 14, which are concentrically aligned about a central longitudinal axis 16 of the electric machine 10. The rotor 14 is configured to rotate relative to the stator 12. The electric machine 10 may be an electrical motor, wherein the rotor 14 rotates relative to the stator 12 to convert electrical energy to mechanical energy. Alternatively, the electric machine is an electrical generator, wherein the relative rotation between the rotor 14 and the stator 12 converts mechanical energy to electrical energy. In the illustrated embodiment of the electric machine 10, the electric machine 10 is an aircraft engine starter generator. But, the electric machine 10 is not limited to being an aircraft engine starter generator. Rather, the electric machine 10 may be any type of rotating electric machine, such as, but not limited to, a synchronous machine, a multi-phase electric machine, an electric machine with concentrated windings, an electric machine with distributed windings, a reluctance machine, an induction machine, a wound field machine, a salient pole electric machine, an internal permanent magnet (IPM) machine, an electric machine with permanent magnets arranged differently than an IPM machine (e.g., surface PM machines and/or the like), and/or the like.

The stator 12 extends a length along the central longitudinal axis 16. The stator 12 includes a stator core 18 having a central opening 20 that extends along the central longitudinal axis 16. The rotor 14 extends a length along the central longitudinal axis 16. The rotor 14 includes a shaft 22 and a rotor core 24 mounted to the shaft 22. The shaft 22 is configured to rotate about the central longitudinal axis 16 relative to the stator core 18. The rotor core 24 is mounted to the shaft 22 such that the rotor core 24 is configured to rotate about the central longitudinal axis 16 with the shaft 22.

In the illustrated embodiment of FIG. 1, the rotor 14 extends within the central opening 20 of the stator core 18 and is configured to rotate relative to the stator core 18 within the central opening 20. In other words, the stator core 18 of the electric machine 10 extends around the rotor 14 such that the rotor 14 rotates inside the stator 12. Alternatively, the rotor 14 extends around the stator 12 such that the rotor assembly is configured to rotate around the stator 12.

Figure 2:
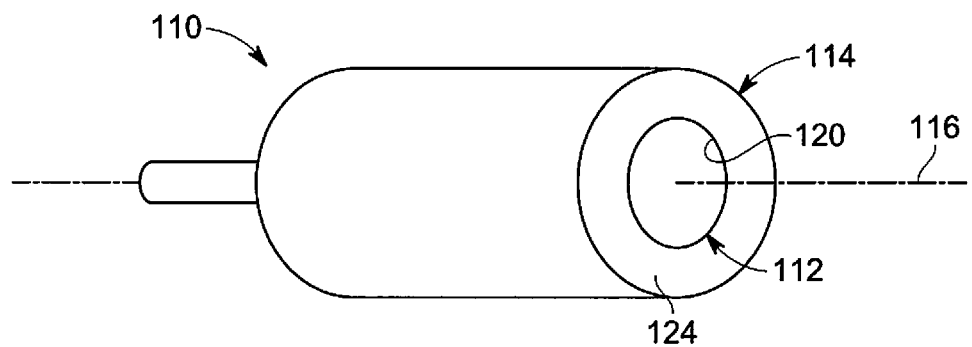
FIG. 2 is a perspective view of another embodiment of an electric machine.

For example, FIG. 2 is a perspective view of another embodiment of an electric machine 110. The electric machine 110 includes a stator 112 and a rotor 114, which are concentrically aligned about a central longitudinal axis 116. The rotor 114 rotates relative to the stator 112 to convert electrical energy to mechanical energy, or vice versa.

The stator 112 and rotor 114 extend lengths along a central longitudinal axis 116. The rotor 114 includes a rotor core 124 having a central opening 120 that extends along the central longitudinal axis 116. The stator 112 extends within the central opening 120 of the rotor core 124 such that the rotor core 124 extends around the stator 112. The rotor core 124 is configured to rotate about the central longitudinal axis 116 relative to the stator 112. In other words, the rotor core 124 is configured to rotate around the stator 112. In the illustrated embodiment of the electric machine 110, the electric machine 110 is an aircraft engine starter generator. But, the electric machine 110 is not limited to being an aircraft engine starter generator. Rather, the electric machine 110 may be any other type of rotating electric machine, as is described above with respect to the electric machine 10.

Figure 3:
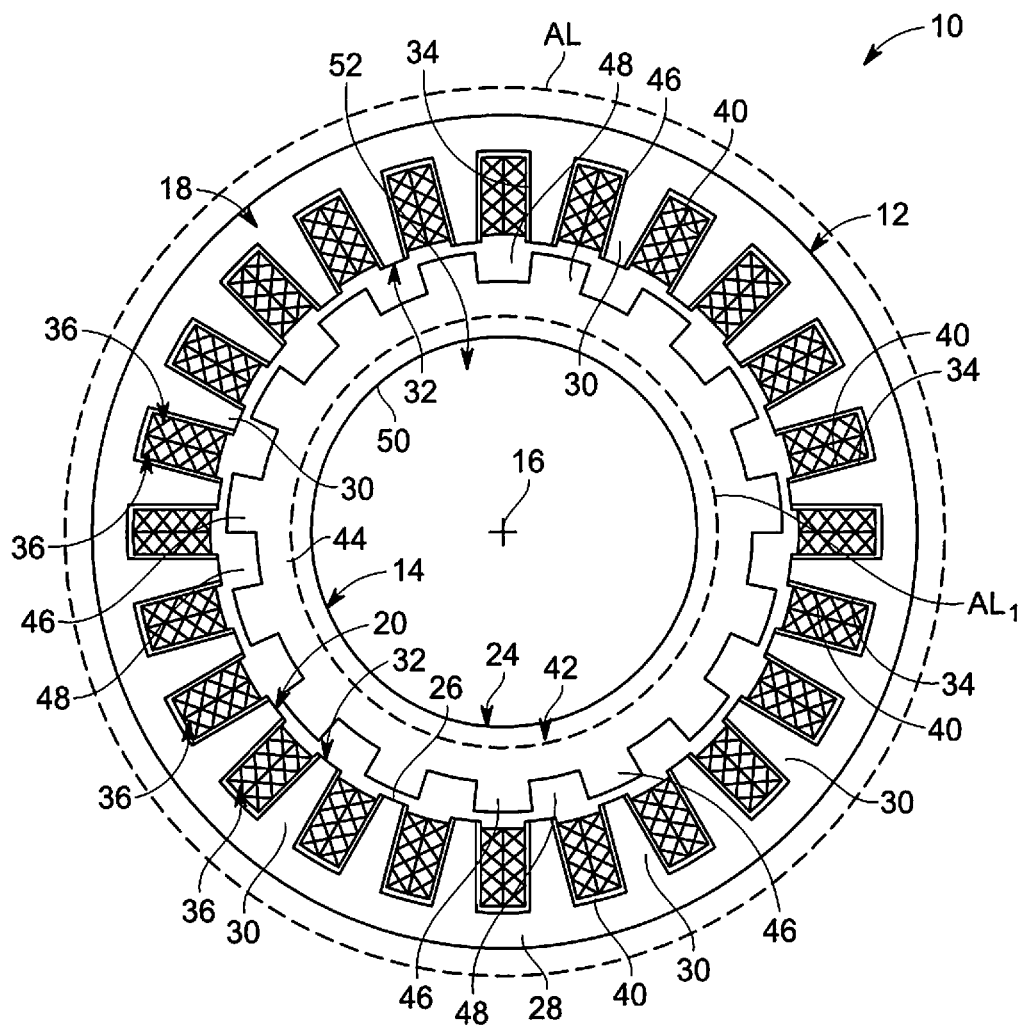
FIG. 3 is a cross-sectional view of the electric machine shown in FIG. 1.

FIG. 3 is a cross-sectional view of the electric machine 10. As described above, the electric machine 10 includes the stator 12 and the rotor 14. The stator 12 includes the stator core 18, which generates a magnetic field. The stator core 12 extends an arc length AL. A radially (relative to the central longitudinal axis 16) inner surface 26 of the stator core 18 defines the central opening 20 of the stator core 18.

In the illustrated embodiment of the stator 12, the stator core 18 includes a stator base 28 and a plurality of stator teeth 30 that extend radially (relative to the central longitudinal axis 16) from the stator base 28. The stator teeth 30 extend radially from the stator base 28 to ends 32 of the stator teeth 30. In the illustrated embodiment of the stator 12, the stator teeth 30 extend radially (relative to the central longitudinal axis 16) inward from the stator base 28. In some alternative embodiments, the stator teeth 30 extend radially (relative to the central longitudinal axis 16) outward from the stator base 28.

As can be seen in FIG. 3, the stator teeth 30 are arranged radially about the central longitudinal axis 16 such that the stator teeth 30 are spaced apart from each other along the arc length AL of the stator core 18. The stator core 18 includes stator slots 34 that extend between adjacent stator teeth 30 along the arc length AL of the stator core 18. In other words, the stator slots 34 are arranged with the stator teeth 30 in an alternating pattern of stator teeth 30 and stator slots 34 along the arc length AL of the stator core 18. The stator slots 34 extend radially (relative to the central longitudinal axis 16) from the stator base 28. In the illustrated embodiment of the stator 12, the stator slots 34 extend radially (relative to the central longitudinal axis 16) inward from the stator base 28. In some alternative embodiments, the ends 32 of adjacent stator teeth 30 are connected together.

The stator 12 includes field coils 36 having windings that are wound around corresponding stator teeth 30. The windings of the coils 36 are wound around the corresponding stator teeth 30 such that the windings of the coils 36 extend within corresponding stator slots 34, as can be seen in FIG. 3. The coils 36 may include one or more direct current (DC) field coils 36 and/or one or more alternating current (AC) field coils 36. In some embodiments, the coils 36 include copper coils. Moreover, in some embodiments, the stator 12 includes fractional-slot concentrated windings (not shown). Each coil 36 may be, or represent, any number of phases, such as, but not limited to, a single phase or three phases.

The stator core 18 may include any number of stator teeth 30 and any number of stator slots 34. In the illustrated embodiment of the stator 12, the stator core 18 includes twenty four stator teeth 30 and twenty four stator slots 34. The stator core 18 may include any number of coils 36. When the stator 12 includes a plurality of phases of AC coils 36, the stator 12 may include any number of sets of the phases.

The stator 12 includes slot liners 40 (better illustrated in FIGS. 4 and 5) that extend within the stator slots 34 for electrically isolating the coils 36 from the stator core 18. The slot liners 40 will be described in more detail below with reference to FIGS. 4 and 5.

The rotor 14 includes the shaft 22 (FIG. 1) and the rotor core 24. The shaft 22 is not shown in FIG. 3 for clarity. The rotor core 24 includes a body 42 that extends a length along the central longitudinal axis 16. The body 42 of the rotor core 24 extends an arc length $AL_1$. The body 42 is configured to rotate about the central longitudinal axis 16 relative to the stator 12. In the illustrated embodiment of the rotor 14, the body 42 includes a rotor base 44, a plurality of magnetic segments 46 that extend radially (relative to the central longitudinal axis 16) from the rotor base 44, and a plurality of non-magnetic segments 48 that extend radially (relative to the central longitudinal axis 16) from the rotor base 44. In the illustrated embodiment of the rotor 14, the segments 46 and 48 extend radially (relative to the central longitudinal axis 16) outward from the rotor base 44. In some alternative embodiments, the segments 46 and 48 extend radially (relative to the central longitudinal axis 16) inward from the rotor base 44.

The magnetic segments 46 and the non-magnetic segments 48 are arranged in an alternating pattern of magnetic segments 46 and non-magnetic segments 48 along the arc length $AL_1$ of the rotor core 24. In other words, the magnetic segments 46 are arranged radially about the central longitudinal axis 16 such that the magnetic segments 46 are spaced apart from each other along the arc length $AL_1$ of the rotor core 24, with the non-magnetic segments 48 extending between adjacent magnetic segments 46 along the arc length $AL_1$ of the rotor core 24. In the illustrated embodiment of the rotor 14, the rotor 14 is a toothed rotor wherein the magnetic segments 46 define rotor teeth 46 of the rotor core 24.

The rotor base 44 of the rotor core body 42 includes a radially (relative to the central longitudinal axis 16) inner surface 50 that defines a central opening 52 of the rotor core 24. The rotor core 24 includes a circumference defined by end surfaces of the magnetic and non-magnetic segments 46 and 48, respectively. An air gap G extends between the circumference of the rotor core 24 and the radially inner surface 26 of the stator core 18. The rotor base 44 may include one or more mortices (not shown) that are configured to receive corresponding tenons (not shown) of the shaft 22 therein for mounting the rotor core body 42 to the shaft 22. Other arrangements for mounting the rotor core body 42 to the shaft 22 may be provided in addition or alternative to the mortices and tenons.

The body 42 of the rotor core 24 may be formed from one or more stacks of a plurality of laminations. As an alternative to using one or more stacks of laminations, the rotor core body 42 may be formed as a single piece of material. The rotor base 44 of the rotor core body 42 may be integrally formed with the magnetic segments 46 and/or the non-magnetic segments 48 from a magnetic material. For example, when the body 42 of the rotor core 24 is formed from a stack of laminations, the rotor base 44 of each lamination, or layer, within the stack may be integrally formed with the magnetic segments 46 and/or the non-magnetic segments 44 of the lamination from a magnetic material. Moreover, and for example, in embodiments wherein the rotor core body 42 is formed as a single piece of material, the rotor base 44 is a single piece of material that is integrally formed with all of the magnetic segments 46 and non-magnetic segments 48 of the rotor core 24 from a magnetic material. In the illustrated embodiment of the rotor 14, the magnetic segments magnetically communicate with the rotor base 44 such that the rotor 14 is a toothed rotor. In other words, the rotor base 44 carries magnetic flux. The toothed rotor structure of the rotor 14, whether constructed of a stack of laminations or a single piece of material, distinguishes the rotor 14 from a "segmented" rotor 14 that includes a rotor core having magnetic segments that are magnetically isolated, or segmented, from the rotor base and each other. As in the illustrated embodiment of the electric machine 10, the stator 12 and/or the rotor 14 may or may not include a permanent magnet. In some alternative embodiments, the rotor 14 is a segmented rotor.

The rotor core 24 may include any number of magnetic segments 46 and/or non-magnetic segments 48. For example, the rotor core 24 may include any number of rotor teeth 46. The rotor core 24 may include the same number of rotor teeth 46 as the number of stator teeth 30 that the stator core 18 includes. Alternatively, the stator core 18 may include a greater or a lesser number of stator teeth 30 than the number of rotor teeth 46 that the rotor core 24 includes. In the illustrated embodiment of the electric machine 10, the rotor core 24 includes fourteen rotor teeth 46, such that the illustrated embodiment of the electrical machine 10 includes a greater number of stator teeth 30 than rotor teeth 46.

Figure 4:
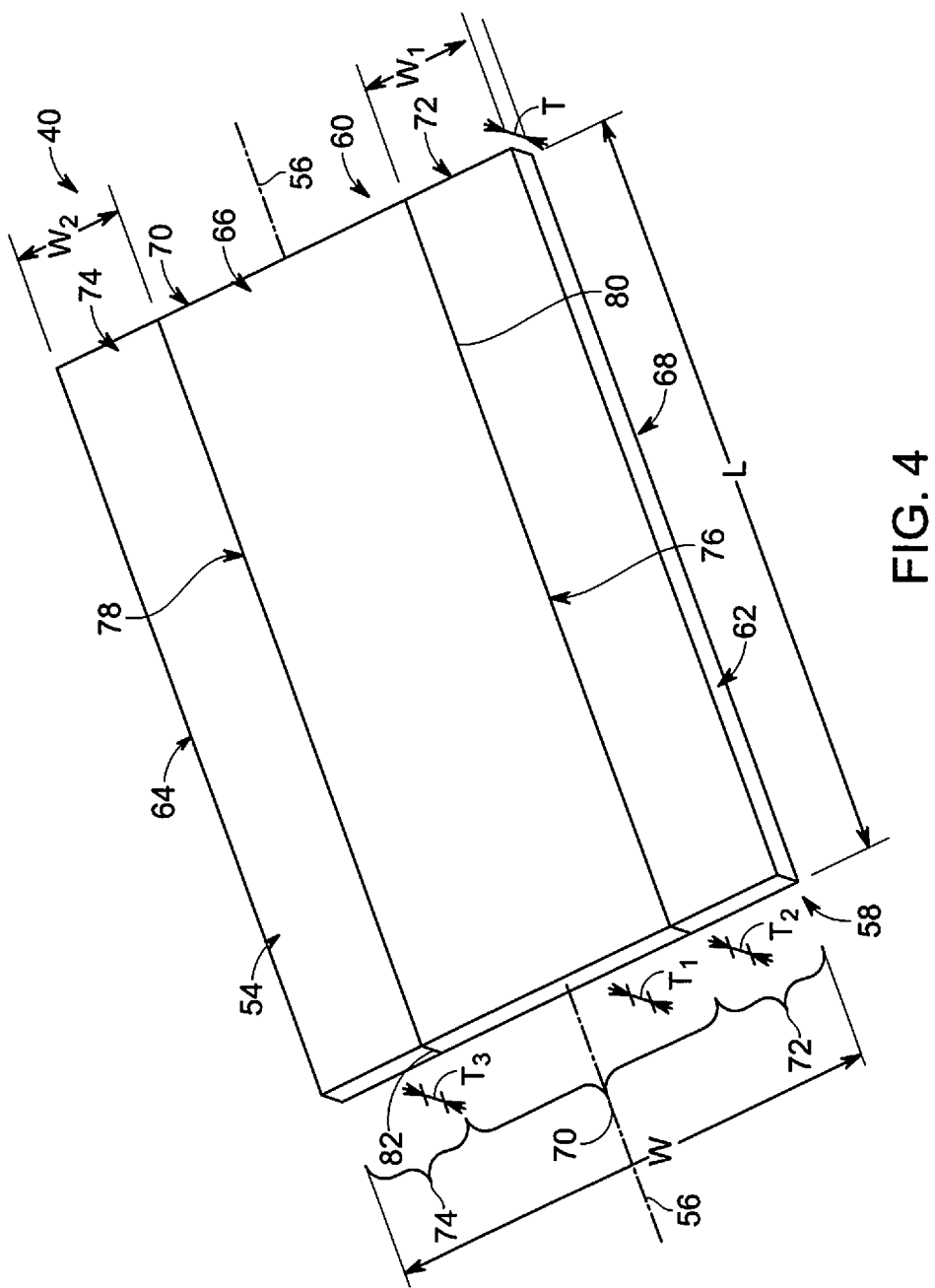
FIG. 4 is a perspective view of an embodiment of a slot liner of the electric machine shown in FIG. 3.
Figure 5:
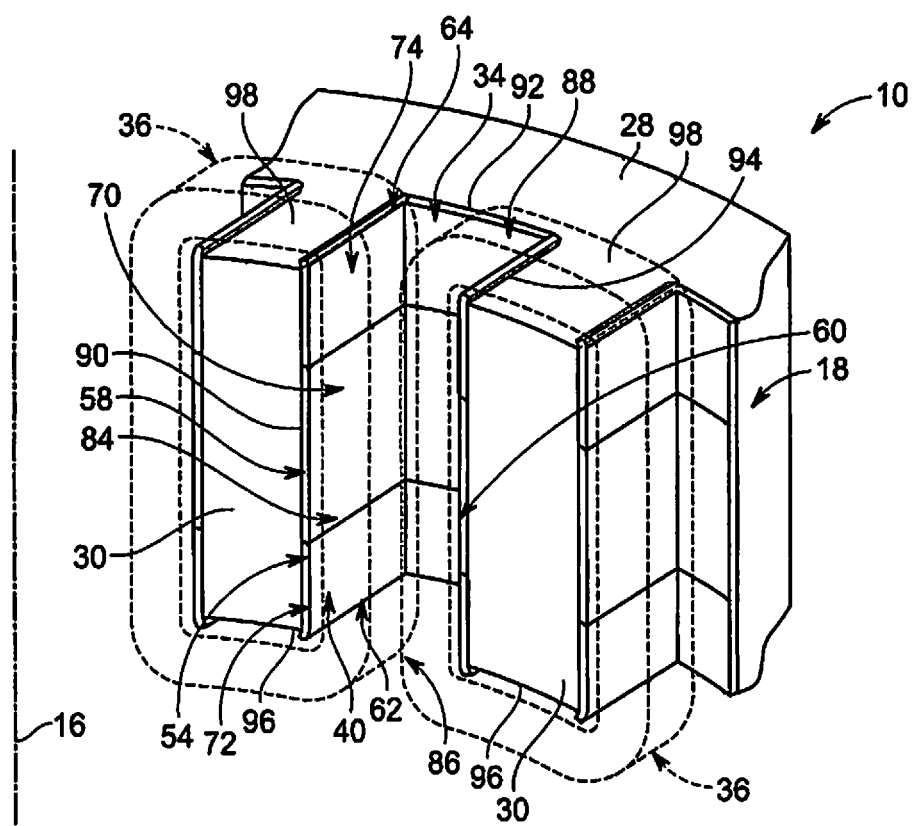
FIG. 5 is a perspective view of a portion of the electric machine shown in FIGS. 1 and 3 illustrating the slot liner shown in FIG. 4 received within an embodiment of a stator slot of the electric machine.

FIG. 4 is a perspective view of an embodiment of a slot liner 40. The slot liner 40 includes a body 54 that is configured to be received within a corresponding stator slot 34 (FIGS. 3 and 5) of the stator core 18 (FIGS. 1, 3, and 5). The body 54 of the slot liner 40 extends a length L along a central longitudinal axis 56 from an end 58 to an end 60 that is opposite the end 58. The body 54 of the slot liner 40 extends a width W from an edge 62 to an edge 64 that is opposite the edge 62. A thickness T of the body 54 is defined from a side 66 of the body 54 to an opposite side 68 of the body 54. Each of the ends 58 and 60 may be referred to herein as a "first" end and/or a "second" end. Each of the edges 62 and 64 may be referred to herein as a "first" edge and/or a "second" edge.

The body 54 of the slot liner 40 includes an inner segment 70 that extends a length along the length L of the body 54 (i.e., along the central longitudinal axis 56). The body 54 also includes two outer segments 72 and 74 that extend lengths along the length L and the central longitudinal axis 56 of the body 54. As can be seen in FIG. 4, the outer segments 72 and 74 flank the inner segment 70 along the length L and the axis 56 of the body 54. In other words, the outer segments 72 and 74 extend on opposite sides 76 and 78 of the inner segment 70 along the length L and axis 56 of the body 54. The inner segment 70 thus extends between the outer segments 72 and 74 along the length L and axis 56 of the body 54. The segments 70, 72, and 74 define interconnected parallel segments that extend along the length L and axis 56 of the body 54. In the illustrated embodiment, the body 54 has a ribbon-like structure that is at least partially defined by the outer segments 72 and 74 flanking the inner segment 70. For example, the ribbon-like structure of the body 54 is at least partially defined by the arrangement of the segments 70, 72, and 74 as interconnected parallel segments that extend along the length L and axis 56 of the body 54. The interconnected segments 70, 72, and 74 of the body 54 define an integral structure such that the body 54 is a single continuous piece. The outer segment 72 includes the edge 62 of the body 54. The outer segment 74 includes the edge 64 of the body 54. Each of the outer segments 72 and 74 of the body 54 may be referred to herein as a "first" and/or a "second" outer segment.

The inner segment 70 of the body 54, in some embodiments, is configured to be more thermally conductive than the neat polyimide (e.g., Kapton®) films of some known slot liners. Such an increased thermal conductivity of the inner segment 70 may enable the slot liner 40 to increase the power density of the electric machine 10 (FIGS. 1, 3, and 5) as compared to the power density of electric machines using known slot liners that are fabricated from neat polyimide films. For example, while the neat polyimide films may have a thermal conductivity of below approximately 0.2 W/mK, the inner segment 70 of the body 54 of the slot liner 40 is configured to have a thermal conductivity of at least approximately 1.5 W/mK. In some embodiments, the inner segment 70 of the body 54 has a thermal conductivity of between approximately 1.5 W/mK and approximately 2.5 W/mK, while in other embodiments the inner segment has a thermal conductivity of greater than approximately 2.5 W/mK. As used herein, the range of "between" approximately 1.5 W/mK and approximately 2.5 W/mK includes the values of approximately 1.5 W/mK and approximately 2.5 W/mK.

The inner segment 70 of the body 54 may be fabricated from any materials to provide the inner segment 70 with the increased thermal conductivity over the neat polyimide films of some known slot liners, while still providing the slot liner 40 as capable of electrically isolating the corresponding coils 36 from the stator core 18. In some embodiments, the inner segment 70 is fabricated from a polyimide that is filled with one or more filler materials that increase the thermal conductivity of the polyimide. Examples of filler materials that increase the thermal conductivity of the polyimide include, but are not limited to, boron nitride, aluminum nitride, diamond, silica, alumina, among others. The polyimide may be filled with any amount of the filler material(s) that provides the inner segment 70 of the slot liner 40 with a thermal conductivity of at least approximately 1.5 W/mK, such as, but not limited to, approximately 40% wt, approximately 50% wt, and approximately 60% wt. In one embodiment, the inner segment 70 of the slot liner 40 includes a polyimide that is filled with approximately 50% wt boron nitride particles (e.g., a powder, granules, and/or the like of boron nitride).

In addition to the filler material(s), the polyimide material used to fabricate the inner segment 70 may be reinforced with one or more reinforcement materials. The reinforcement material(s) increase the strength of the inner segment 70 in tension, shearing (i.e., tearing), and bending, which may prevent the inner segment 70 of the slot liner 40 from tearing, fracturing, and/or otherwise breaking as the windings of the coils 36 are wound around the corresponding stator teeth 30 of the slot liner 40. Examples of reinforcement materials for the inner segment 70 include, but are not limited to, glass fibers, polyether ether ketone (PEEK) fibers, poly(ether-ketone-ketone) (PEKK) fibers, para-aramid synthetic fibers (e.g., Kevlar®), polybenzimidazole (PBI) fibers, among others.

Each of the outer segments 72 and 74 of the body 54 are configured to retain the general flexibility of the neat polyimide films of some known slot liners. The flexibility of the outer segments 72 and 74 increases the resistance of the body 54 of the slot liner 40 to tearing, fracturing, and/or otherwise breaking, for example at the edges 62 and/or 64, as the windings of the coils 36 are wound around the corresponding stator teeth 30 of the slot liner 40. Moreover, the flexibility of the outer segments 72 and 74 enables the body 54 to bend and/or fold during winding of the coils 36 around the corresponding stator teeth 30, which may prevent the body 54 from tearing, fracturing, and/or otherwise breaking. For example, the flexibility of the outer segments 72 and 74 enables the body 54 to bend and/or fold during a trickle impregnation process used to wind the coils 36 around the corresponding stator teeth 30.

To retain the general flexibility of the neat polyimide films of some known slot liners, the outer segments 72 and 74 are each a neat polyimide. As used herein, a "neat" polyimide is a polyimide that includes less than approximately 5% wt of a different material (e.g., a filler material, a reinforcement material, and/or the like). In some embodiments, a neat polyimide does not include any other materials (besides the polyimide). Each segment 70 and 72 may be any type of neat polyimide, such as, but not limited to, a Kapton® material, an Apical® material, a UPILEX® material, a VTEC™ material, a Norton® material, a Kaptrex® material, among others. In some embodiments, the outer segments 70 and 72 are fabricated from the same neat polyimide, while in other embodiments the outer segment 72 is fabricated from a different neat polyimide as compared to the outer segment 74.

As should be understood from the above description, the inner segment 70 includes at least one different material than the outer segments 72 and 74. Specifically, while all of the segments 70, 72, and 74 are fabricated from polyimide, the inner segment 70 additionally includes the filler material(s) and optionally includes the reinforcement material(s). In some embodiments, the inner segment 70 is fabricated from the same polyimide as the outer segment 72 and/or as the outer segment 74. In other embodiments, the inner segment 70 is fabricated from a different polyimide as the outer segment 72 and/or as the outer segment 74.

The different material(s) of the inner segment 70 of the body 54 provides the inner segment 70 with a thermal conductivity that is greater than the thermal conductivity of the outer segments 72 and 74. Specifically, the filler material(s) provide the inner segment 70 with a thermal conductivity of at least approximately 1.5 W/mK (as described above), while the neat polyimide of the outer segments 72 and 74 may provide the outer segments 72 and 74 with a thermal conductivity of below approximately 0.2 W/mK. But, the neat polyimide of each of the outer segments 72 and 74 provides the outer segments 72 and 74 with a greater flexibility than the inner segment 70. Specifically, the neat polyimide of each of the outer segments 72 and 74 retains the flexibility that is lost to the inner segment 70 via the inclusion of the filler material(s).

The length L and width W of the body 54 of the slot liner 40 may each have any value and the length L may have any value relative to the width W of the body 54. In the illustrated embodiment, the value of the length L of the body 54 is greater than the value of the width W of the body 54. Alternatively, the width W of the body 54 is greater than the length L. The overall thickness T of the body 54 may have any value. In some embodiments, the overall thickness T of the body 54 has a value such that the body 54 is considered to be a "film". For example, the body 54 of the slot liner 40 may be considered a film when the overall thickness T is less than approximately 0.3 millimeters (mm).

Although shown as having the shapes of a rectangle (e.g., as defined two-dimensionally between the ends 58 and 60 and the edges 62 and 64) and a parallelepiped (e.g., as defined three-dimensionally between the ends 58 and 60, the edges 62 and 64, and the sides 66 and 68), the body 54 may additionally or alternatively include any other shape. For example, the corners where the ends 58 and 60 intersect the edges 62 and 64 may have a more rounded shape in other embodiments. Moreover, and for example, the body 54 may have an oval two-dimensional shape (e.g., as defined between the ends 58 and 60 and the edges 62 and 64 or similar structures thereto) or a tapered (e.g., an hourglass) two-dimensional shape.

In the illustrated embodiment, each of the segments 70, 72, and 74 has an approximately equal length. Moreover, in the illustrated embodiment, each of the segments 70, 72, and 74 extends along an approximate entirety of the length L of the body 54 from the end 58 to the end 60. But, each segment 70, 72, and 74 may extend along any amount of the overall length L of the body 54 and the length of each segment 70, 72, and 74 may have any value relative to the lengths of the other segments 70, 72, and 74. For example, in some alternative embodiments, the lengths of the outer segments 72 and 74 are shorter than the length of the inner segment 70, or vice versa. Moreover, although shown as having approximately the same value, widths $W_1$ and $W_2$ of the outer segments 72 and 74, respectively, may alternatively have different values. Although shown as being greater than the widths $W_1$ and $W_2$ of the outer segments 72 and 74, respectively, the width of the inner segment 70 may alternatively be less than the width $W_1$ and/or the width $W_2$.

While the segments 70, 72, and 74 are shown as having the same approximate values of respective thickness $T_1$, $T_2$, and $T_3$ in the illustrated embodiment, each thickness $T_1$, $T_2$, and $T_3$ may have any value relative to the other thicknesses $T_1$, $T_2$, and $T_3$. The shape of the body 54 and/or the various values of the length L, the widths W, $W_1$, and $W_2$, the thicknesses T, $T_1$, $T_2$, and $T_3$, and the lengths of the segments 70, 72, and 74 may be selected and/or configured: (1) to enable the body 54 of the slot liner 40 to electrically isolate the corresponding coils 36 from the stator core 18; (2) to provide the inner segment 70 with a thermal conductivity of at least approximately 1.5 W/mK; (3) to provide the outer segments 72 and 74 with a greater flexibility than the inner segment 70; (4) to provide the outer segments 72 and 74 with a flexibility that is substantially similar to the general flexibility of a neat polyimide film; (5) based on the geometry of the corresponding stator slot 34; and/or (6) based on the geometry of the corresponding coils 36.

The body 54 of the slot liner 40 may be fabricated using any process, method, structure, means, and/or the like, such as, but not limited to, using a casting process, using a batch process, using a line process, among others. The filled (and optionally reinforced) polyimide of the inner segment 70 is bonded to the neat polyimide of the outer segments 72 and 74 at joints 80 and 82 between the inner segment and the outer segments 72 and 74, respectively. The bonds between the inner segment 70 and the outer segments 72 and 74 at the respective joints 80 and 82 may be primary bonds. Such primary bonds between the inner segment 70 and the outer segments 72 and 74 may provide the joints 80 and 82 as approximately smooth. In other words, primary bonds between the inner segment 70 and the outer segments 72 and 74 may provide the body 54 with seamless transitions from the inner segment 70 to the outer segments 72 and 74. In some embodiments, the bonds between the inner segment 70 and the outer segments 72 and 74 at the respective joints 80 and 82 are formed without the use of any additional adhesives and/or other secondary bonding materials.

When the body 54 is fabricated using a casting process, the segments 70, 72, and 74 may be cast together in a single casting process. Alternatively, the inner segment 70 is cast using a first casting process and the outer segments 72 and 74 are subsequently cast on the opposite sides 76 and 78 of the inner segment 70 using a second casting process.

One non-limiting example of fabricating the body 54 includes, after mixing and gassing, preparing a polyamic acid solution that contains boron nitride powder. The inner segment 70 is then film cast with at least one ply of reinforcement material. The outer segments 72 and 74 are then film cast on the opposite sides 76 and 78 of the inner segment 70 using neat polyamic acid resin. After the film casting processes, the body 54 is heated to between approximately 80° C. and approximately 100° C. to remove solvent and is imidized at a higher temperature process (e.g., up to between approximately 250° C. and approximately 300° C.) to form the completed body 54.

FIG. 5 is a perspective view of a portion of the electric machine 10 illustrating the slot liner 40 received within a corresponding stator slot 34 of the electric machine 10. Two adjacent stator teeth 30 are shown in FIG. 5, with the stator slot 34 extending therebetween. Coils 36 are shown wound around the stator teeth 30 such that the coils 36 extend within the stator slot 34. The coils 36 are shown in Phantom lines in FIG. 5 for clarity. The winding configuration of the coils 36 around the stator teeth 30 shown in FIG. 5 is meant as exemplary only. As described above, the coils 36 may have any winding configuration. For example, although two coils 36 are shown as extending within the stator slot 34 in FIG. 5, in some embodiments, one or more of the stator slots 34 includes only one coil 36 extending therein.

As can be seen in FIG. 5, the stator slot 34 extends radially (relative to the central longitudinal axis 16) from the stator base 28 to a tip opening 84 of the stator slot 34. The stator slot 34 extends a height along the central longitudinal axis 16 from an end opening 86 to an opposite end opening 88. Each of the end openings 86 and 88 may be referred to herein as a "first" and/or a "second" end opening.

The body 54 of the slot liner 40 is received within the corresponding stator slot 34 such that the body 54 extends between the stator core 18 and each coil 36 that extends within the stator slot 34. Specifically, the body 54 of the slot liner 40 extends between the coils 36 and surfaces 90, 92, and 94 of the stator core 18 that define the stator slot 34. The body 54 of the slot liner 40 thereby electrically isolates the coils 36 from the stator core 18.

As can be seen in FIG. 5, the body 54 of the slot liner 40 is received within the stator slot 34 such that the ends 58 and 60 of the body 54 are positioned proximate the tip opening 84. Moreover, the edges 62 and 64 are positioned proximate the end openings 86 and 88, respectively. Although shown as being aligned with surfaces 96 and 98 of the stator teeth 34, the edges 62 and/or 64 may alternatively extend past (along the central longitudinal axis 16) the respective surfaces 96 and 98.

The coils 36 are wound around the stator teeth 34 such that the coils 36 are wrapped over the edges 62 and 64 and over the inner segment 70 that extends therebetween. The thermal conductivity of the inner segment 70 may enable the body 54 of the slot liner 40 to increase the power density of the electric machine 10, for example as compared to the power density of electric machines using known slot liners that are fabricated from neat polyimide (e.g., Kapton®) films. The flexibility provided by the outer segments 72 and 74 increases the resistance of the body 54 of the slot liner 40 to tearing, fracturing, and/or otherwise breaking, for example at the edges 62 and/or 64, as the windings of the coils 36 are wound around the stator teeth 30. The flexibility of the outer segments 72 and 74 may enable the body 54 to bend and/or fold during winding of the coils 36 around the corresponding stator teeth 30, which may prevent the body 54 from tearing, fracturing, and/or otherwise breaking. For example, the flexibility of the outer segments 72 and 74 may enable the body 54 to bend and/or fold during a trickle impregnation process used to wind the coils 36 around the corresponding stator teeth 30. Moreover, the optional reinforcement material(s) of the inner segment 70 may prevent the inner segment 70 of the slot liner 40 from tearing, fracturing, and/or otherwise breaking as the windings of the coils 36 are wound around the corresponding stator teeth 30. Accordingly, the body 54 of the slot liner 40 has an increased thermal conductivity as compared to at least some known slot liners, while maintaining the flexibility of at least some known slot liners at the edges 62 and 64 of the body 54.

Figure 6:
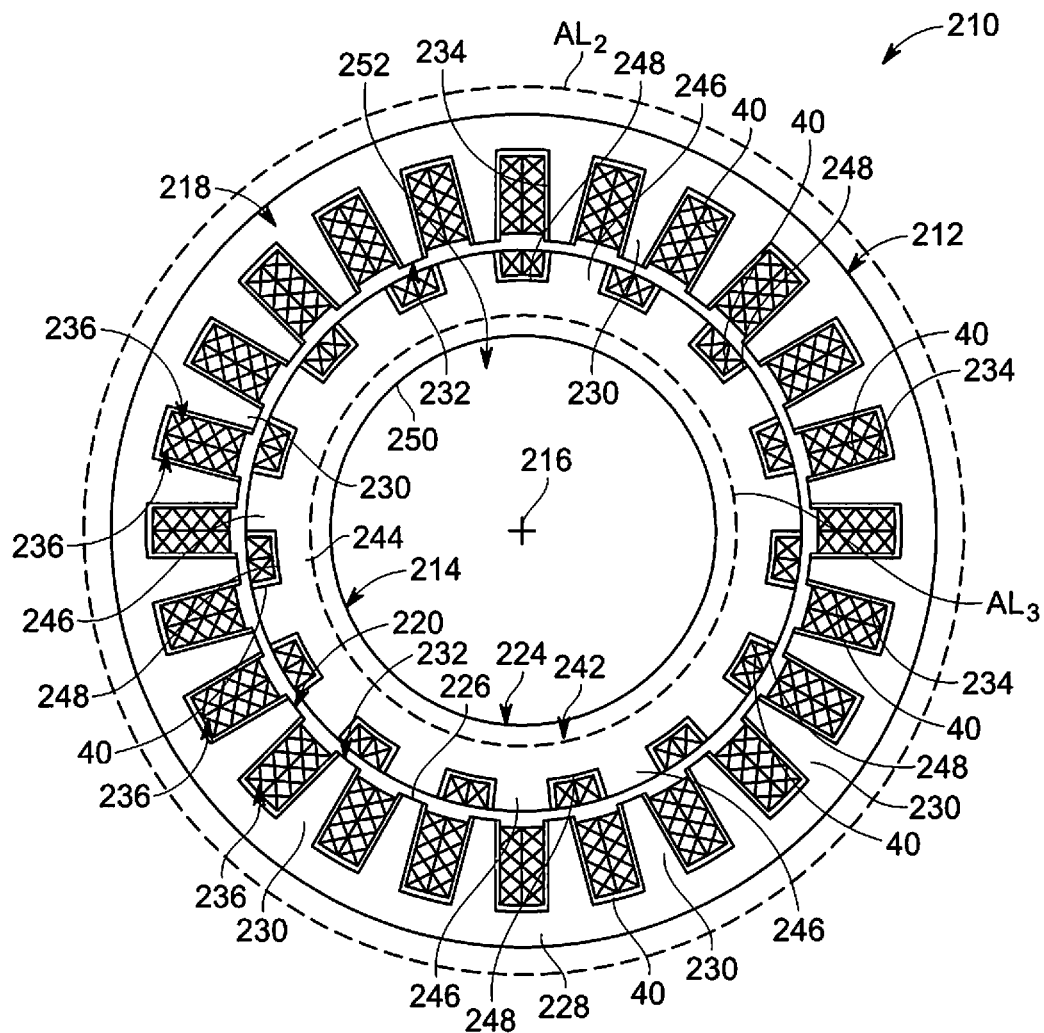
FIG. 6 is a cross-sectional view of another embodiment of an electric machine.

FIG. 6 is a cross-sectional view of another embodiment of an electric machine 210. The electric machine 10 includes a stator 212 and a rotor 214. The stator 212 includes a stator core 218, which generates a magnetic field. The stator core 212 extends an arc length $AL_2$. A radially (relative to a central longitudinal axis 216) inner surface 226 of the stator core 218 defines a central opening 220 of the stator core 218.

In the illustrated embodiment of the stator 212, the stator core 218 includes a stator base 228 and a plurality of stator teeth 230 that extend radially (relative to the central longitudinal axis 216) from the stator base 228. The stator teeth 230 extend radially from the stator base 228 to ends 232 of the stator teeth 230. In the illustrated embodiment of the stator 212, the stator teeth 230 extend radially (relative to the central longitudinal axis 216) inward from the stator base 228. In some alternative embodiments, the stator teeth 230 extend radially (relative to the central longitudinal axis 216) outward from the stator base 228.

As can be seen in FIG. 6, the stator teeth 230 are arranged radially about the central longitudinal axis 216 such that the stator teeth 230 are spaced apart from each other along the arc length $AL_2$ of the stator core 218. The stator core 218 includes stator slots 234 that extend between adjacent stator teeth 230 along the arc length $AL_2$ of the stator core 218. In other words, the stator slots 234 are arranged with the stator teeth 230 in an alternating pattern of stator teeth 230 and stator slots 234 along the arc length $AL_2$ of the stator core 218. The stator slots 234 extend radially (relative to the central longitudinal axis 216) from the stator base 228. In the illustrated embodiment of the stator 212, the stator slots 234 extend radially (relative to the central longitudinal axis 216) inward from the stator base 228. In some alternative embodiments, the ends 232 of adjacent stator teeth 230 are connected together.

The stator 212 includes stator coils 236 having windings that are wound around corresponding stator teeth 230. The windings of the coils 236 are wound around the corresponding stator teeth 230 such that the windings of the coils 236 extend within corresponding stator slots 234, as can be seen in FIG. 6. The coils 236 may include one or more DC field coils 236 and/or one or more AC field coils 236. In some embodiments, the coils 236 include copper coils. Moreover, in some embodiments, the stator 212 includes fractional-slot concentrated windings (not shown). Each coil 236 may be, or represent, any number of phases, such as, but not limited to, a single phase or three phases.

The stator core 218 may include any number of stator teeth 230 and any number of stator slots 234. In the illustrated embodiment of the stator 212, the stator core 218 includes twenty four stator teeth 230 and twenty four stator slots 234. The stator core 218 may include any number of coils 236. When the stator 212 includes a plurality of phases of AC coils 236, the stator 212 may include any number of sets of the phases.

The stator 212 includes the slot liners 40 (better illustrated in FIGS. 4 and 5) that extend within the stator slots 234 for electrically isolating the coils 236 from the stator core 218. The slot liners 40 are described in more detail above with reference to FIGS. 4 and 5.

The rotor 214 includes a rotor shaft (not shown, e.g., the rotor shaft 22 shown in FIG. 1) and a rotor core 224. The rotor core 224 includes a body 242 that extends a length along the central longitudinal axis 216. The body 242 of the rotor core 224 extends an arc length $AL_3$. The body 242 is configured to rotate about the central longitudinal axis 216 relative to the stator 212. In the illustrated embodiment of the rotor 214, the body 242 includes a rotor base 244, a plurality of rotor teeth 246 that extend radially (relative to the central longitudinal axis 216) from the rotor base 244, and a plurality of rotor slots 248 that extend radially (relative to the central longitudinal axis 216) from the rotor base 244. In the illustrated embodiment of the rotor 214, the rotor teeth 246 and the rotor slots 248 extend radially (relative to the central longitudinal axis 216) outward from the rotor base 244. In some alternative embodiments, the rotor teeth 246 and the rotor slots 248 extend radially (relative to the central longitudinal axis 216) inward from the rotor base 244.

The rotor teeth 246 and the rotor slots 248 are arranged in an alternating pattern of teeth 246 and slots 248 along the arc length $AL_3$ of the rotor core 224. In other words, the rotor teeth 246 are arranged radially about the central longitudinal axis 216 such that the rotor teeth 246 are spaced apart from each other along the arc length $AL_3$ of the rotor core 224, with the rotor slots 248 extending between adjacent rotor teeth 246 along the arc length $AL_3$ of the rotor core 224.

The rotor base 244 of the rotor core body 242 includes a radially (relative to the central longitudinal axis 216) inner surface 250 that defines a central opening 252 of the rotor core 224. The rotor core 224 includes a circumference defined by end surfaces of the rotor teeth 246. An air gap extends between the circumference of the rotor core 224 and the radially inner surface 226 of the stator core 218. The rotor base 244 may include one or more mortices (not shown) that are configured to receive corresponding tenons (not shown) of the rotor shaft therein for mounting the rotor core body 242 to the rotor shaft. Other arrangements for mounting the rotor core body 242 to the rotor shaft may be provided in addition or alternative to the mortices and tenons.

The body 242 of the rotor core 224 may be formed from one or more stacks of a plurality of laminations. As an alternative to using one or more stacks of laminations, the rotor core body 242 may be formed as a single piece of material. The rotor base 244 of the rotor core body 242 may be integrally formed with the rotor teeth 246 from a magnetic material. The stator 212 and/or the rotor 214 may or may not include a permanent magnet.

The rotor core 224 may include any number of rotor teeth 246 and/or rotor slots 248. The rotor core 224 may include the same number of rotor teeth 246 as the number of stator teeth 230 that the stator core 218 includes. Alternatively, the stator core 218 may include a greater or a lesser number of stator teeth 230 than the number of rotor teeth 246 that the rotor core 224 includes. In the illustrated embodiment of the electric machine 210, the rotor core 224 includes fourteen rotor teeth 246, such that the illustrated embodiment of the electrical machine 210 includes a greater number of stator teeth 230 than rotor teeth 246.

The rotor 214 includes rotor coils 336 having windings that are wound around corresponding rotor teeth 246. The windings of the coils 336 are wound around the corresponding rotor teeth 246 such that the windings of the coils 336 extend within corresponding rotor slots 248, as can be seen in FIG. 6. The coils 336 may include one or more DC field coils 336 and/or one or more AC field coils 336. In some embodiments, the coils 336 include copper coils. Moreover, in some embodiments, the rotor 214 includes fractional-slot concentrated windings (not shown). Each coil 336 may be, or represent, any number of phases, such as, but not limited to, a single phase or three phases.

The rotor 214 includes the slot liners 40 (better illustrated in FIGS. 4 and 5) that extend within the rotor slots 248 for electrically isolating the coils 336 from the rotor core 224. The slot liners 40 are positioned and function within the rotor slots 248 in a substantially similar manner to the position and function of the slot liners 40 within the stator slots 34 (FIGS. 3 and 5) and within the stator slots 234. The slot liners 40 may be sized and/or shaped differently for the rotor slots 248 as compared to the size and/or shape of the slot liners 40 for the stator slots 234. Moreover, although the stator 212 of the electric machine 210 is shown including the coils 236 and the slot liners 240, the slot liners 40 may be used with an electrical machine (not shown) wherein the stator thereof does not include the coils 236 and/or the slot liners 40. The slot liners 40 may be used with any type of rotor of any type of electric machine.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A slot liner for at least one of a stator or a rotor of an electric machine, the slot liner comprising:
    a body in the form of a polyimide film configured to be received within at least one of a stator slot of the stator or a rotor slot of the rotor, the body extending a length from a first end to an opposite second end; the body extending a width from a first edge to an opposite second edge, the body comprising:
        an inner segment extending along the length of the body; and
        first and second outer segments extending along the length of the body, the first and second outer segments flanking the inner segment along the length of the body such that the inner segment extends between the first and second outer segments along the length of the body and such that the first outer segment includes the first edge of the body and the second outer segment includes the second edge of the body, wherein the inner segment includes filler material such that a thermal conductivity of the inner segment is greater than a thermal conductivity of the first and second outer segments, wherein the thermal conductivity of the inner segment of the body of the slot liner is between approximately 1.5 W/mK and approximately 2.5 W/mK, and the thermal conductivity of the first and second outer segments of the body of the slot liner is less than approximately 0.2 W/mK, the filler material is between approximately 40% wt and approximately 60% wt of the inner segment and includes boron nitride, aluminum nitride diamond, silica, or alumina, the inner segment is reinforced with at least one of glass fibers, polyether ether ketone (PEEK) fibers, poly(ether-ketone-ketone) (PEKK) fibers, para-aramid synthetic fibers, or polybenzimidazole fibers, the first and second outer segments of the body are a neat polyimide, and a thickness of the polyimide film is less than approximately 0.3 mm.

2. The slot liner of claim 1, wherein the thermal conductivity of the inner segment of the body is between approximately 1.5 W/mK and approximately 2.5 W/mK, and the thermal conductivity of the first and second outer segments of the body is less than approximately 0.2 W/mK.

3. The slot liner of claim 1, wherein the first and second outer segments of the body have a greater flexibility than the inner segment.

4. The slot liner of claim 1, wherein the first and second outer segments of the body are a neat polyimide.

5. The slot liner of claim 1, wherein the first and second outer segments flank the inner segment along the length of the body.

6. A stator for an electric machine, the stator comprising:
    a stator core extending a length along a central longitudinal axis, the stator core comprising a stator base, stator teeth that extend radially from the stator base relative to the central longitudinal axis, and stator slots that extend between adjacent stator teeth;
    a coil wound around a corresponding stator tooth, the coil extending within a corresponding stator slot; and
    a slot liner according to claim 1 received within the corresponding stator slot.

7. The stator of claim 6, wherein the slot liner is received within the corresponding stator slot such that the slot liner extends between the coil and the surfaces of the stator core that define the corresponding stator slot for electrically isolating the coil from the stator core.

8. The stator of claim 6, wherein the corresponding stator slot within which the slot liner is received extends radially from the stator base, relative to the central longitudinal axis, to a tip opening, the corresponding stator slot extending a height along the central longitudinal axis from a first end opening to a second end opening, the body of the slot liner extending a width from a first edge to an opposite second edge, the slot liner being received within the corresponding stator slot such that the first and second ends of the body are positioned proximate the tip opening and such that the first and second edges are positioned proximate the first and second end openings, respectively.

9. The stator of claim 6, wherein the first and second outer segments of the body of the slot liner have a greater flexibility than the inner segment.

10. The stator of claim 6, wherein the first and second outer segments of the body of the slot liner are a neat polyimide.

11. A rotor for an electric machine, the rotor comprising:
- a rotor core extending a length along a central longitudinal axis, the rotor core comprising a rotor base, rotor teeth that extend radially from the rotor base relative to the central longitudinal axis, and rotor slots that extend between adjacent rotor teeth;
- a coil wound around a corresponding rotor tooth, the coil extending within a corresponding rotor slot; and
- a slot liner according to claim 1 received, within the corresponding rotor slot.

12. A core for a rotor or stator for an electric machine, the core extending a length along a central longitudinal axis and comprising a base, teeth that extend radially from the base relative to the central longitudinal axis, slots that extend between adjacent teeth, and a slot liner according to claim 1 received within the corresponding slot.

* * * * *